US006675676B2

(12) United States Patent
Beutler

(10) Patent No.: US 6,675,676 B2
(45) Date of Patent: Jan. 13, 2004

(54) DIFFERENTIAL COVER FOR A VEHICLE THAT PROVIDES UNIFORM SEALING

(75) Inventor: Kevin Ray Beutler, Burton, MI (US)

(73) Assignee: Americam Axle & Manufacturing, Inc., Detroit, MI (US)

( * ) Notice: Subject to any disclaimer, the term of this patent is extended or adjusted under 35 U.S.C. 154(b) by 12 days.

(21) Appl. No.: 10/017,563

(22) Filed: Dec. 14, 2001

(65) Prior Publication Data

US 2003/0110885 A1 Jun. 19, 2003

(51) Int. Cl.$^7$ ............................................... F16H 57/02
(52) U.S. Cl. ..................................... 74/606 R; 277/637
(58) Field of Search ......................... 74/606 R, 607; 277/628, 630, 637

(56) References Cited

U.S. PATENT DOCUMENTS

| | | | | |
|---|---|---|---|---|
| 1,903,146 A | * | 3/1933 | Sterling | 74/607 |
| 2,478,180 A | | 8/1949 | Buckendale | 74/607 |
| 2,480,833 A | | 9/1949 | Buckendale | 74/607 |
| 2,561,335 A | * | 7/1951 | Buckendale | 475/246 |
| 3,161,250 A | | 12/1964 | Gardner | |
| D220,541 S | * | 4/1971 | Liddiard | D15/148 |
| 3,930,421 A | | 1/1976 | Geis, Jr. | 74/607 |
| 4,506,561 A | | 3/1985 | Hayakawa | 74/606 |
| 4,625,581 A | | 12/1986 | Hull | 74/606 |
| 4,959,043 A | * | 9/1990 | Klotz et al. | 475/230 |
| 5,099,717 A | | 3/1992 | Ochiai et al. | 74/606 |
| D327,280 S | * | 6/1992 | Macomber | D15/148 |
| 5,257,962 A | * | 11/1993 | Martin et al. | 475/200 |
| 5,271,294 A | | 12/1993 | Osenbaugh | 74/607 |
| 5,294,350 A | | 3/1994 | Murphy et al. | 210/168 |
| 5,404,772 A | | 4/1995 | Jester | 74/606 |
| 5,442,977 A | | 8/1995 | Danjou et al. | 74/607 |
| 5,620,388 A | | 4/1997 | Schlegelmann et al. | 475/230 |
| 5,839,327 A | | 11/1998 | Gage | 74/607 |
| 5,913,547 A | | 6/1999 | Fernandez | 29/525.02 |
| 5,927,384 A | | 7/1999 | Waldner, Jr. | 165/47 |
| 6,076,428 A | | 6/2000 | Thoma et al. | 74/606 |
| 6,155,135 A | | 12/2000 | Gage et al. | 74/606 |
| 6,364,803 B1 | * | 4/2002 | Barnholt et al. | 475/246 |

FOREIGN PATENT DOCUMENTS

| | | |
|---|---|---|
| DE | 3026535 | 2/1982 |
| EP | 1 028 273 | 8/2000 |
| FR | 2 149 620 | 3/1973 |

* cited by examiner

Primary Examiner—Thomas R. Hannon
Assistant Examiner—Vicky A. Johnson
(74) Attorney, Agent, or Firm—Harness, Dickey & Pierce P.L.C.

(57) ABSTRACT

A differential cover for a differential unit of a vehicle includes a central area, a flange area having a lower surface facing a mating direction for mating with a surface of a differential housing. The flange area has a plurality of apertures distributed along the flange area. The flange between centerlines of adjacent apertures defines a plurality of segments, each of which extending further in the mating direction than the lower surfaces of the segment at respective centerlines.

8 Claims, 5 Drawing Sheets

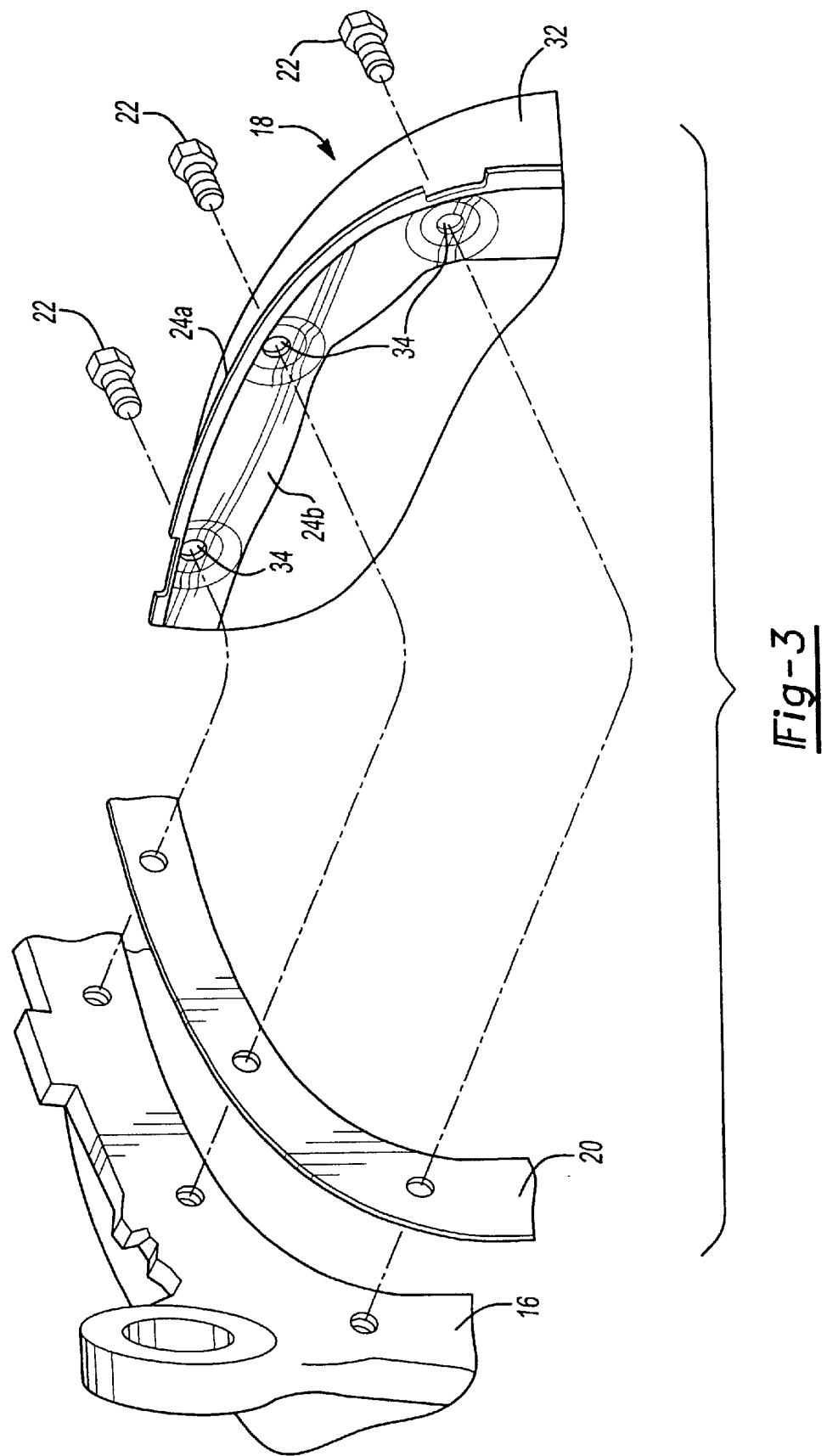

| X DIM. MM | Y MM |
|---|---|
| 6 | .000 |
| 9.31 | .090 |
| 18.62 | .246 |
| 27.93 | .320 |
| 37.25 | .343 |
| 46.56 | .320 |
| 55.87 | .246 |
| 65.19 | .090 |
| 68.5 | .000 |

DIFFERENTIAL COVER FOR A VEHICLE THAT PROVIDES UNIFORM SEALING

FIELD OF THE INVENTION

The present invention relates generally to a cover for a differential unit of a vehicle, and more particularly, the present invention relates to a cover for a differential unit that is shaped to optimize sealing between the differential cover and the differential housing.

BACKGROUND OF THE INVENTION

Presently, vehicles are equipped with a differential gearing unit positioned between the vehicle transmission and output axles to supply a driving force to the vehicle wheels. The differential unit, itself, contains gearing to adjust the torque and velocity relationship from that supplied from the transmission output shaft (and into the differential) and the resultant torque and rotational velocity supplied to the output axles. The differential further includes a differential housing and differential cover which assemble to protect the gearing from the external environment and to maintain lubricants within the housing. Accordingly, the sealing relationship between the differential cover and the housing is of critical importance to ensure that lubricants do not leak out and external contaminants, such as dirt, do not enter the working environment of the differential gearing. To effectuate this assembly, a plurality of bolts provide a clamping force to clamp a gasket between the cover and the housing. The bolts connect the cover and the housing and apply a pressing force on the gasket to maximize sealing. While this arrangement does provide sealing capabilities, some drawbacks exist. Specifically, the clamping force applied to the gasket in the immediate proximity of the bolts is greater than the clamping force provided along the cover at positions between the bolts. As such, these areas have a lower clamping force and lower contact sealing stress/pressure distribution, and are therefore more susceptible to leakage than that of areas proximate the bolts. The present invention was developed in light of these and other drawbacks.

SUMMARY OF THE INVENTION

To address these and other drawbacks, a differential cover for a differential unit of a vehicle includes a central area, a flange area having a lower surface facing a mating direction for mating with a surface of a differential housing. The flange area has a plurality of apertures distributed along the flange area. The flange between centerlines of adjacent apertures defines a plurality of segments, each of which extends further in the mating direction than the lower surfaces of the segment at respective centerlines.

In another aspect, a differential unit for a vehicle includes a housing, a differential cover having a flange, and a gasket positioned between the flange and the housing to seal an interior of the housing from an external environment. The differential cover is attached to the housing by a plurality of bolts which pass through the flange and clamp the differential cover to the gasket to apply a clamping force to the gasket. The flange is elastically deformed at areas between the bolts to provide a clamping force to the gasket. As a result, a combined force on the gasket caused by the elastically deformed areas and the bolts provide a substantially equal clamping force which translates to substantially equal contact sealing pressure distribution on the gasket.

Further areas of applicability of the present invention will become apparent from the entailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 3 is an exploded perspective view of a differential cover and housing assembly according to the present invention;

DETAILED DESCRIPTION OF THE PREFERRED EMBODIMENTS

Figure 1:
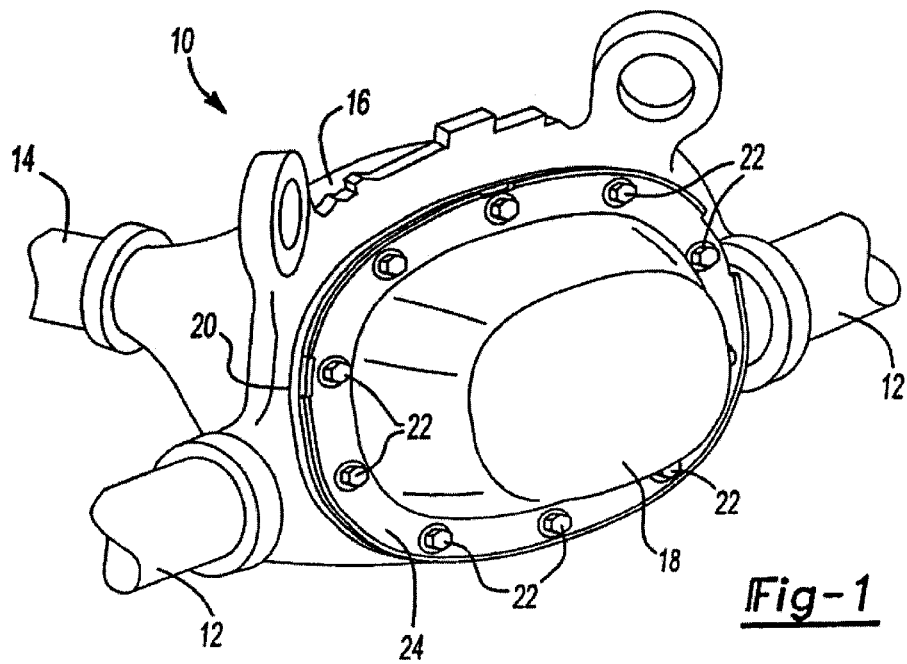
FIG. 1 is a perspective view of a differential unit including a differential housing and cover according to the present invention.

Referring now to FIG. 1, differential unit 10 is shown having output axles 12 extending laterally outward therefrom and input shaft 14 that supplies rotational energy from a vehicle transmission (not shown) into differential unit 10. Differential unit 10, itself, has a housing 16, differential cover 18, and a gasket 20 positioned there between. Cover 18 has a central area 32 and a flange area 24 at an outer periphery of central area 32 that provides a sealing surface to support gasket 20 against housing 16. Flange area 24 has bolt holes or apertures 34 (see FIG. 3) to allow bolts 22 to pass therethrough to attach to housing 16 and press gasket 20 there between to seal the interior of differential unit 10 from the external environment. Flange 24 also has a lower surface 24B and an upper surface 24A.

Referring to FIG. 3, the assembly of differential cover 18 to housing 16 is shown in greater detail. Here, bolts 22 pass through flange 24 to thread to housing 16 and press gasket 20 between housing 16 and flange 24. As the abutment of the head of bolts 22 against flange 24 is what provides the clamping force, the maximum amount of clamping force supplied by the bolts 22 is in proximity to the location of bolts 22 along flange 24. Therefore, it can be seen that the area along flange 24 between bolts 22 exerts a lower clamping force on gasket 20 than does the area immediately proximate the location of bolts 22. Accordingly, as shown in FIG. 3, the present invention provides a continuous arc between bolts 22 to increase the clamping force at locations distal from bolts 22.

Figure 2:
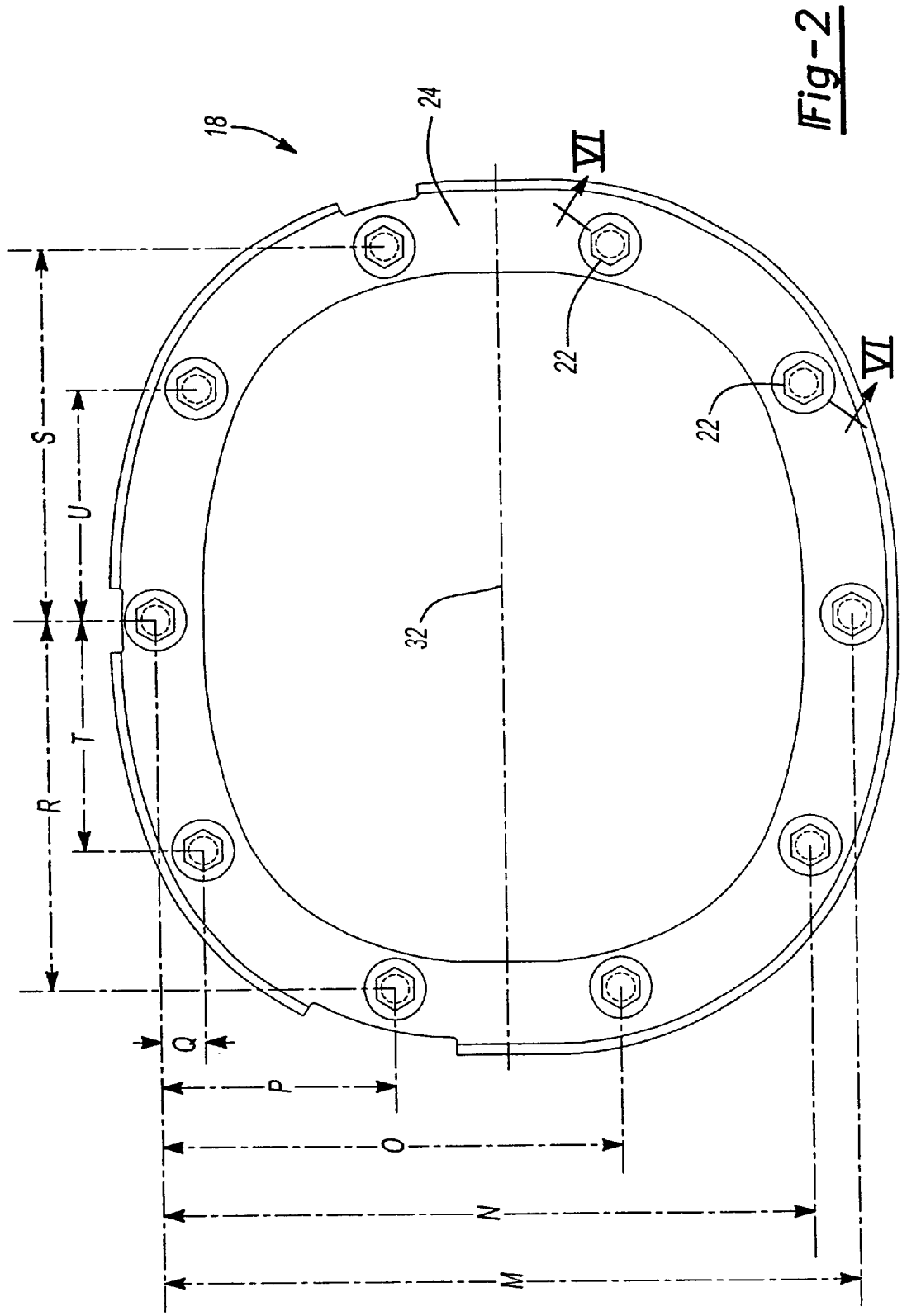
FIG. 2 is a schematic view of the bolt layout of a differential cover according to the present invention.

Referring to FIGS. 2, 4, 5 and 6, a preferred embodiment of the present invention is shown and described. In FIG. 2, the dimensions of an example differential cover 18 are shown. These dimensions are described by the following:

M=223.52 mm
N=209.30
O=148.59
P=74.93
Q=14.22
R=116.33
S=116.33
T=73.02
U=73.02

Figure 4:
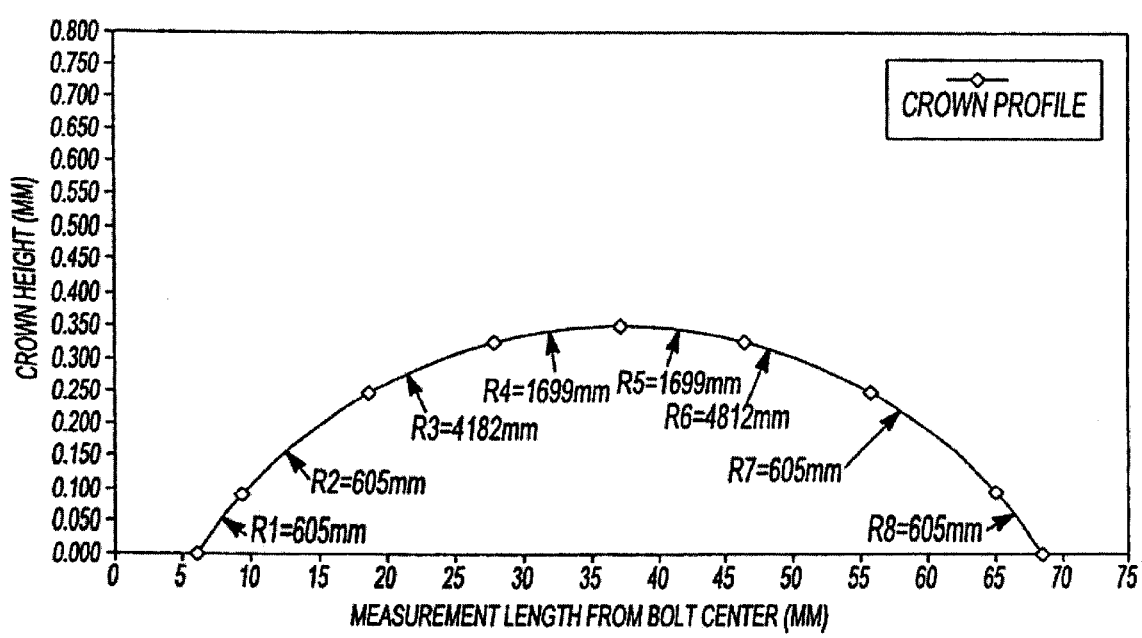
FIG. 4 is a graphical view of a profile of a segment of a differential cover according to a preferred embodiment of the present invention.
Figures 5, 6:
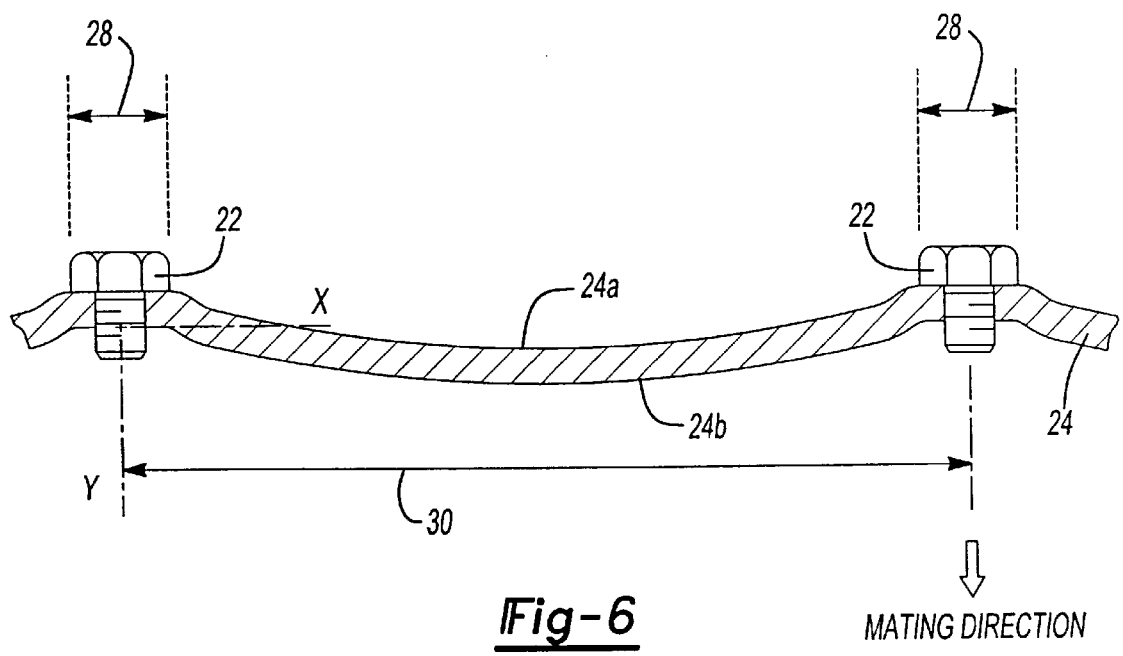
FIG. 5 is a chart showing the dimensions of the segment of the differential cover for the graph provided in FIG. 4.
FIG. 6 is a cross sectional view along VI—VI of FIG. 2.

However, the present invention may also be used on other differential cover designs having different dimensions than that shown in FIG. 2, and the present invention is not limited to the specific arrangement shown and described herein. FIG. 6 shows a coordinate system applied to the unfastened flange 24. Specifically, FIG. 6 describes an X dimension starting from a lower surface 24A at the center line of an aperture 34 for each bolt 22 and extending along flange 24 until reaching a centerline of an adjacent aperture. This dimension from centerlines along the X axis is hereinafter defined as a segment, such as segment 30. Likewise, Y defines an axis perpendicular to the X axis that passes through the centerline of each aperture 34. Accordingly, FIG. 4 and FIG. 5 show the X and Y dimensions of the bottom surface of the flange according to the example of the preferred embodiment. Here, as seen in FIG. 5, the Y dimension of flange 24 remains zero until the edge of the bolt 22 is reached (about 0.55 mm). Thereafter, flange 24 begins to extend along a continuous curve, as described in FIGS. 4 and 5, until reaching a maximum at the midpoint between the centerlines of bolts 22. Thereafter, the continuous curve extends back toward the X axis until reaching the outer periphery of the adjacent bolt. This continuous curve forms an inverse arc that provides extra clamping force at positions between the bolts 22 (as will be further described herein).

The operation and assembly of the present invention is now described with reference to FIG. 7. $\sigma_B$ and $F_B$ is the contact sealing stress and the clamping force provided by the bolts 22 acting to clamp gasket between flange 24 and housing respectively. $\sigma_E$ and $F_E$ is the contact sealing stress and the spring force against the gasket 20 and housing 16 exerted from the cover between bolts 22. And, $\sigma_{E+B}$ and $F_{E+B}$ is the combination of those two respectively.

Figure 7:
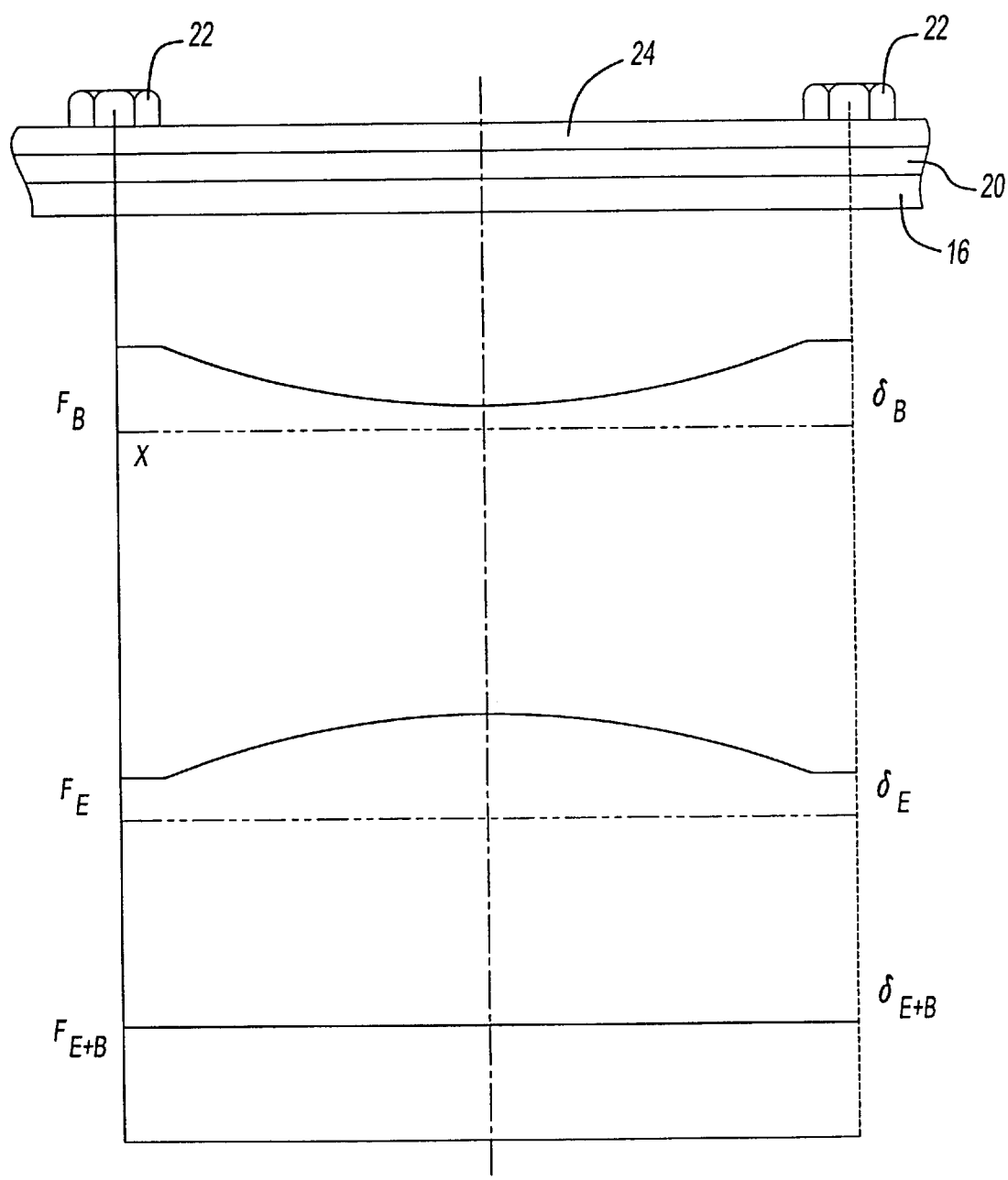
FIG. 7 is a graphical view showing and assembly and force/contact sealing pressure distribution on a differential cover according to the present invention.

At the top of FIG. 7, the flange, gasket, and housing 16 are shown in a clamped and fastened relationship with bolts 22. In this condition, two different forces act to clamp gasket 20 between flange 24 and housing 16. Specifically, $F_b$ is the clamping force provided by the bolts 22. As shown, $F_b$ remains constant until the edge of bolt 22 is reached. Thereafter, $F_b$ drops in a curved relationship until reaching a midpoint between the bolts 22, and then begins to curvingly increase until reaching the edge of the adjacent bolt 22. However, when assembled, the previously described bowed area, bowed in a direction toward mating with the housing 16, is now flat. Due to the elastic properties of the metal from which the flange and cover are constructed, the now flat flange area 24 exerts a spring force against the gasket 20 and housing 16. This force is shown as $F_e$ in FIG. 7. As such, the elastic force due this curved geometry of the flange 24 begins at a minimum force under bolt 22. Thereafter, the elastic force curvingly increases until reaching the midpoint between the bolts, since the maximum curvature of flange 24 exists at this midpoint. As this force changes in an opposite fashion with respect to that exerted by $F_b$, the combined force $F_b$ and $F_e$ add together to result in an equivalent and even force between bolts 22 as shown in FIG. 7.

When reviewing FIG. 7, it can be generally understood that to achieve the best combined force $F_e$ plus $F_b$, a flange surface having a curved arc shape is most suitable. However, it is noted that any shape in which flange 24 is shaped more toward a direction of mating between bolts helps equalize the resulting force $F_e$ plus $F_b$, and provides uniform contact sealing stress distribution.

The assembly of the differential cover 18 to the housing 16 can generally be understood from reviewing FIGS. 3 and 7 (top). First, the cover 18, gasket 20 and housing 16 is arranged as shown in FIG. 3. Then, bolts 22 are positioned through apertures 34, through gasket 20 and threaded into cover 16 to thereby clamp the arrangement and flatten flange 24 as shown in FIG. 7.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A differential unit for a vehicle comprising:

a housing;

a differential cover having a flange; and a gasket positioned between the flange and the housing to seal an interior of the housing from an external environment;

wherein the differential cover is attached to the housing by a plurality of bolts, the bolts passing through the flange and clamping the differential cover to the gasket to apply a clamping force to the gasket;

wherein the flange applies a spring load to the gasket due to elastic deformation at areas between the bolts to provide a clamping force to the gasket, a combined force on the gasket caused by the spring load and the bolts providing a substantially equal clamping force and uniform contact sealing stress/pressure distribution on the gasket along the flange.

2. A method for assembling a differential cover to a differential housing to enclose a differential unit, the method comprising the steps of:

providing a differential cover having a flange with a plurality of apertures provided therethrough, the flange having a lower surface on a mating side, areas along the flange between the apertures being bowed in a direction toward the mating side;

positioning a gasket between the mating side of the flange and an open area of the housing;

clamping the cover to the housing with the gasket there between by passing bolts through the apertures and tightening the bolts to the housing;

wherein the bowed areas of the flange are pressed against the housing and are elastically straightened when the differential cover is clamped to the housing, wherein the elastically straightened portions of the differential cover apply a force against the gasket that combines with a clamping force supplied by the bolts to provide a substantially equal clamping force and uniform contact sealing stress/pressure distribution on the gasket.

3. The method of claim 2, comprising forming the bowed areas of the flange in a profile having a plurality of radii.

4. A differential cover for a differential unit of a vehicle, the differential cover comprising:

a central area; and a flange area positioned at an outer periphery of the central area, the flange area having a lower surface facing a mating direction, and a plurality of apertures distributed along the flange area;

wherein areas of the flange between centerlines of adjacent apertures defines a plurality of segments, each segment having at least a portion of the lower surface extending further in the mating direction than the lower surfaces of the segment at respective centerlines;

wherein the lower surface of each segment further includes a midpoint between respective centerlines that extends farther in the mating direction than a remainder of the lower surface of the segment, and extends in a curving fashion from points proximate the centerline to the midpoint;

wherein for each segment, X defines a direction from each centerline of one aperture at the lower surface to a centerline of an adjacent aperture at the lower surface, wherein Y defines axes parallel to and intersecting centerlines of each aperture and are perpendicular to X, Y extending in the mating direction, wherein X and Y are defined by:

X=6 mm and Y=0 mm;
X=9.31 mm and Y=0.09 mm;
X=18.62 mm and Y=0.246 mm;
X=27.93 mm and Y=0.32 mm;
X=37.25 mm and Y=0.343 mm;
X=46.56 mm and Y=0.320 mm;
X=55.87 mm and Y=0.246 mm;
X=65.15 mm and Y=0.09 mm; and
X=68.5 mm and Y=0 mm.

5. A differential unit for a vehicle comprising:

a housing;

a differential cover having a central body section;

a flange radially extending from an outer periphery of the central body section, the flange having a plurality of apertures distributed along the flange, a plurality of generally flat plate portions each adjacent one of the apertures, and a plurality of curved plate portions each joining adjacent ones of the flat plate portions;

a gasket positioned between the flange and the housing; and a plurality of bolts each sequentially passing through one of the apertures along the flange and the gasket to connect the flange and the gasket to the differential cover;

wherein bolt installation induces an elastic deformation of the curved plate portions between the bolts until the flange and the differential cover are substantially parallel, providing a substantially equal clamping force and a uniform contact sealing stress/pressure distribution on the gasket from the flange and the differential cover.

6. The differential unit of claim 5, comprising:

a centerline disposed through each aperture; and a maximum curvature of each curved plate portion located at a midpoint between adjacent centerlines.

7. The differential unit of claim 5, wherein both the flat plate portions and the curved plate portions each comprise an upper surface and an opposed lower gasket sealing surface.

8. The differential unit of claim 7, wherein the lower gasket sealing surface is oriented toward a mating direction of the differential cover.

* * * * *